(12) United States Patent
Wang

(10) Patent No.: US 7,114,259 B2
(45) Date of Patent: Oct. 3, 2006

(54) RECIPROCATING SAW

(75) Inventor: Haiqing Wang, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 153 days.

(21) Appl. No.: 10/706,824

(22) Filed: Nov. 14, 2003

(65) Prior Publication Data

US 2004/0255474 A1 Dec. 23, 2004

(30) Foreign Application Priority Data

Nov. 18, 2002 (CN) ............................... 02 2 58628

(51) Int. Cl.
B23D 49/10 (2006.01)

(52) U.S. Cl. .................. 30/392; 30/394; 83/699.21

(58) Field of Classification Search .................. 83/778, 83/785, 698.71, 699.21; 30/393, 392, 394; 173/49, 170, 114

See application file for complete search history.

(56) References Cited

U.S. PATENT DOCUMENTS

| 2,917,088 | A | | 12/1959 | Papworth |
| 3,785,053 | A | * | 1/1974 | Michaelson .................. 30/394 |
| 3,890,708 | A | | 6/1975 | Bauer .......................... 30/393 |
| 4,238,884 | A | * | 12/1980 | Walton, II .................... 30/393 |
| 4,262,421 | A | * | 4/1981 | Bergler et al. ................ 30/393 |
| 4,545,123 | A | | 10/1985 | Hartmann ..................... 30/393 |
| 5,099,705 | A | * | 3/1992 | Dravnieks ...................... 74/50 |
| 5,170,564 | A | | 12/1992 | Kaiser .......................... 30/393 |
| 5,392,519 | A | | 2/1995 | Inoue et al. .................. 30/393 |
| 5,644,846 | A | * | 7/1997 | Durr et al. ................... 30/393 |
| 6,742,266 | B1 | * | 6/2004 | Splane, Jr. ................... 30/392 |

FOREIGN PATENT DOCUMENTS

DE          3643279 A1 *    6/1988

* cited by examiner

Primary Examiner—Boyer D. Ashley
Assistant Examiner—Omar Flores-Sánchez
(74) Attorney, Agent, or Firm—John R. Thompson; Stoel Rives LLP

(57) ABSTRACT

A reciprocating saw, comprises: a housing [13], a plunger [15], a driving gear [7], a link shaft [4], a pushing member [9], a lifting member [11], a front end portion of said link shaft [4] rotatablely connect with a rear end portion of said plunger [15], said lifting member [1] connect with said housing [13] and contact with a front end portion of said pushing member [9], said lifting member [11] also contact with a sleeve bearing which disposed on a rear end portion of said plunger [15], a angle between lines through a center of a first eccentric shaft [5], a rotating center of said driving gear [7] and a rotating center of a second eccentric shaft [8] is an obtuse angle. Said pushing member will move back and forth when said link shaft [4] move forward, the movement of said pushing member in the direction opposite to the movement of said link shaft will eliminate the vibration which resulting from the reciprocating movements of said plunger.

8 Claims, 3 Drawing Sheets

RECIPROCATING SAW

FIELD OF THE INVENTION

The present utility model relates to a reciprocating saw.

BACKGROUND

In the prior art, a reciprocating saw comprises: a housing; a plunger in the housing for mounting a saw blade; a driving gear connecting with driving mechanism; a first eccentric shaft and a second eccentric shaft which all disposed on said driving gear; a link shaft which rear end portion connecting with said first eccentric shaft; a pushing member which rear end portion rotatablely connecting with said second eccentric shaft, a lifting member; a front end portion of said link shaft rotatablely connecting with a rear end portion of said plunger, said lifting member pivotally connecting with said housing; a first eccentric shaft drives a link shaft to move reciprocally so that the plunger is able to drive a saw blade move reciprocally fore and aft when the driving gear rotate. For saving energy, the saw blade is desired in a depress downwardly state from the workpiece when the saw blade move in the anti teeth direction, and the saw blade is desired in a slightly lifting upwardly state from the workpiece, for obtaining such a desirable solution, a blade orbital lifting device is supplied, a actuating member for blade lifting device in the conventional design actuating the blade lifting device by the pull way, in this kind structure, the moving direction of the actuating member is consistent with the moving direction of the plunger of the reciprocating saw so that caused a acute vibration of the reciprocating saw during using.

Invention Content

The object of present utility model is to provide a low vibration reciprocating saw.

The technical proposal of the present utility model is: a reciprocating saw, comprising: a housing; a plunger in the housing for mounting a saw blade; a driving gear connecting with driving mechanism; a first eccentric shaft] and a second eccentric shaft which all disposed on said driving gear; a link shaft which rear end portion connecting with said first eccentric shaft; a pushing member which rear end portion rotatablely connecting with said second eccentric shaft, a lifting member; a front end portion of said link shaft rotatablely connecting with a rear end portion of said plunger, said lifting member pivotally connecting with said housing; said lifting member contacting with a front end portion of said pushing member and also contacting with a sleeve bearing which disposed on a rear end portion of said plunger, a angle formed between lines through a axle center of a first eccentric shaft, a axle center of said driving gear and a axle center of a second eccentric shaft is an obtuse angle, said lines lies in a plane which perpendicular to said first eccentric shaft.

The advantages of the present utility model as following:

The angle between lines through a center of a first eccentric shaft, a rotating center of said driving gear and a rotating center of a second eccentric shaft is an obtuse angle so that said pushing member will move backward when said link shaft move forward, the movement of said pushing member in the direction opposite to the movement of said link shaft will eliminate the vibration which resulting from the reciprocating movements of said plunger.

BRIEF DESCRIPTION OF THE DRAWINGS

The accompanying drawings which are incorporated in, and constitute a part of, this specification illustrate one embodiment of the utility model and together with the description serve to explain the principles of the utility model.

DESCRIPTION OF THE PREFERED EMBODIMENTS

Figure 1:
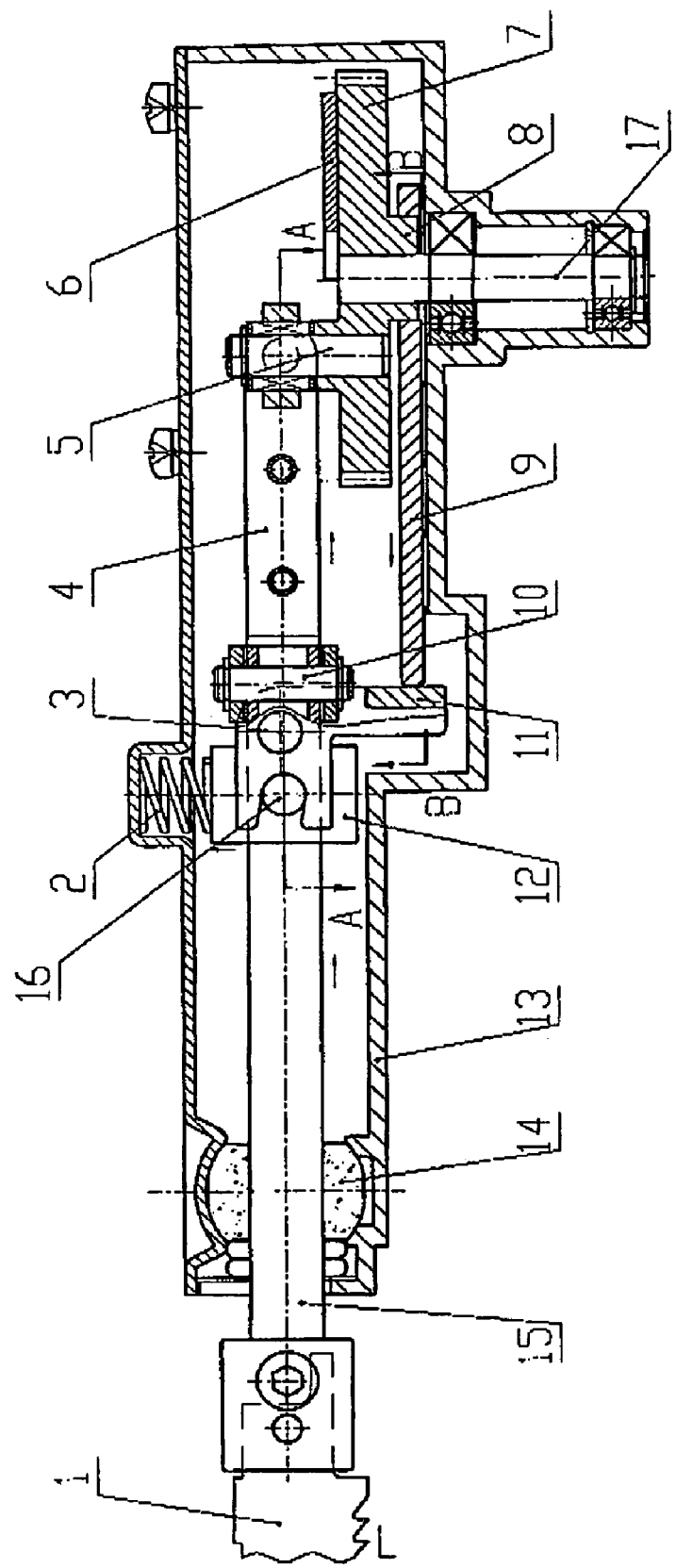
FIG. 1 shows a mainly sectional view of this utility model.
Figure 2:
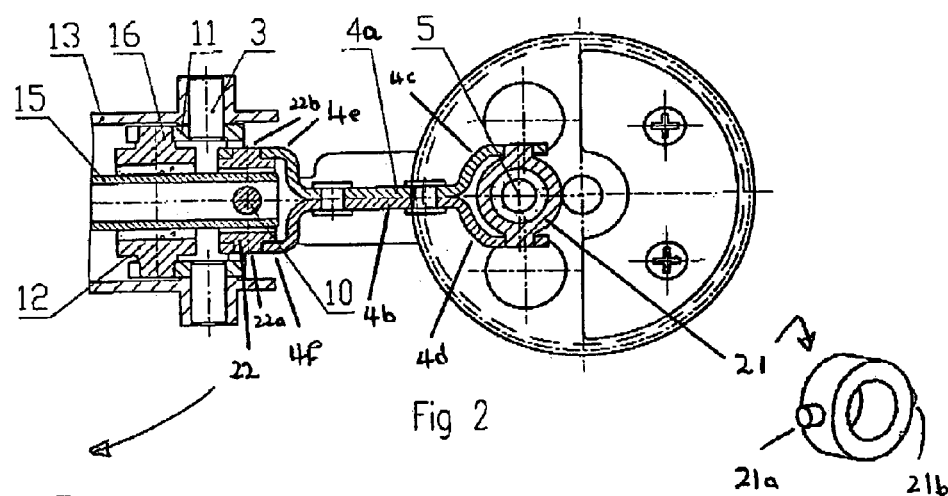
FIG. 2 shows a sectional view in line A—A of FIG. 1.
Figure 3:
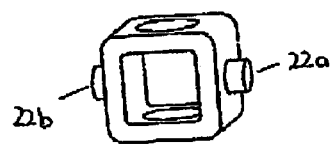
FIG. 3 shows a sectional view in line B—B of FIG. 1.
Figure 3:
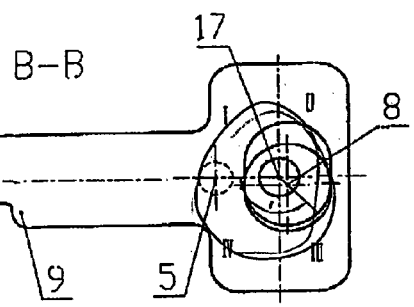
Figure 5:
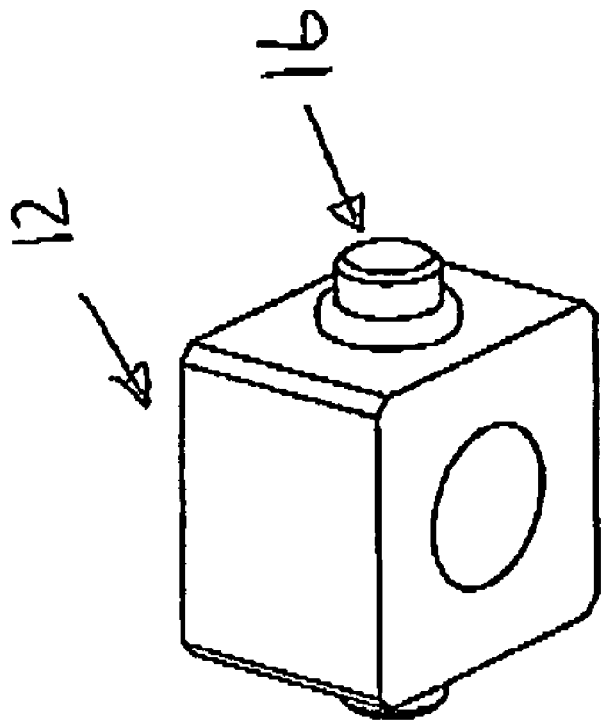
FIG. 5 shows a perspective view of said sleeve bearing;
In all the FIGS, the numbers respectively indicate to:
[1], a saw blade; [2], a spring; [3], a pivot; [4], a link shaft; [5], a first eccentric shaft; [6], a counterweight; [7], a driving gear; [8], a second eccentric shaft; [9], a pushing member; [10], a pivot for said link shaft; [11], a lifting member; [12], a sleeve bearing; [13], a housing; [14], a ball bearing; [15], a plunger; [16], a connecting pin; [17], transmitting gear shaft.
Figure 4:
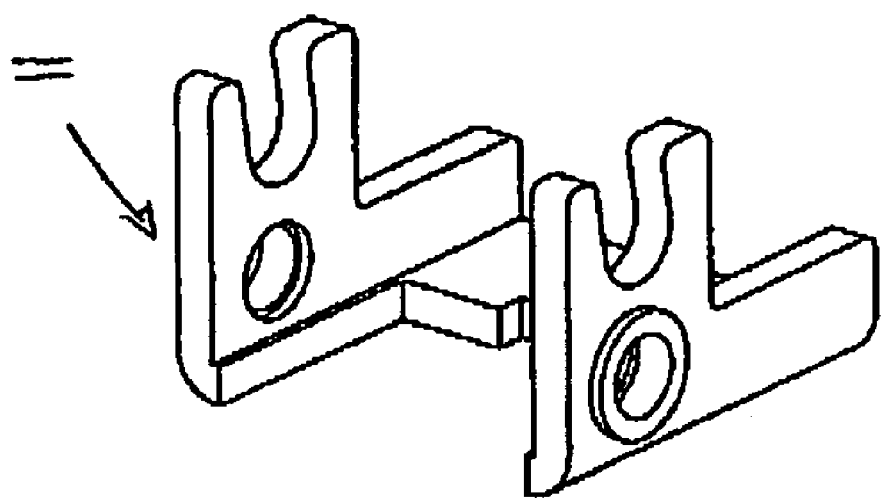
FIG. 4 shows a perspective view of said lifting member.

See the accompanying FIGS. 1 and 2, A reciprocating saw, comprising: a housing[13]; a plunger [15] in the housing for mounting a saw blade [1]; a driving gear [7] connecting with driving mechanism; a first eccentric shaft [5] and a second eccentric shaft [8] which all disposed on said driving gear [7]; a link shaft [4] which rear end portion connecting with said first eccentric shaft [5]; a pushing member [9] which rear end portion rotatablely connecting with said second eccentric shaft [8], a lifting member [11]; a front end portion of said link shaft [4] rotatablely connecting with a rear end portion of said plunger [15], said lifting member [11] pivotally connecting with said housing [13] via a pivot [3]; said lifting member [11] contacting with a front end portion of said pushing member [9] and also contacting with a sleeve bearing [12] which disposed on the rear end portion of said plunger [15]. A front end portion of said pushing member push said lifting member [11] rotating about a pivot [3] in the clockwise direction when said pushing member move forward actuating by the rotation of said driving gear, so that said lifting member [11] lift said sleeve bearing [12] upwardly which bring a rear end portion of said plunger [15] move upwardly together, the upward movement of said plunger [15] cause said plunger [15] swing about a ball bearing [14] so that said saw blade [1] mounting on the front end portion of said plunger [15] synchronically move downwardly, this downwardly movement is propitious to the cutting operation During the saw blade return, upon the depressing of the spring [2], said lifting member [11] rotates about the pivot [3] in the anticlockwise direction, the movements of the rear end portion of said plunger [15] is in the downward direction, so the plunger [15] swing about the ball bearing [14] in the clockwise direction and the saw blade [1] lifted upwardly slightly away from the workpiece, then reducing the friction between the saw blade [1] and the workpiece so energy be saved. As illustrated in FIG. 3, a angle formed between lines through the axle center of a first eccentric shaft [5], the axle center of said driving gear [7] and the axle center of a second eccentric shaft [8] is an obtuse angle, said lines lies in a plane which perpendicular to said first eccentric shaft [5], in the other word, if dividing the plane into I, II, III and IV four quadrants by the axle center of said driving gear shaft [17], then the axle center of said first eccentric shaft [5] and the axle center of said second eccentric shaft [8] will not lie in a same quadrant.

A front end portion of said pushing member [9] is against upon a lower rear portion of said lifting member [11], a upper front end portion of said lifting member [11] is against upon said sleeve bearing [12]. A spring [2] providing between said housing [13] and said sleeve bearing [12]. Said first eccentric shaft [5] and said second eccentric shaft [8] respectively provided on the top surface and the bottom surface of said driving gear [7].

The invention claimed is:

1. A reciprocating saw comprising:
   a housing;
   a plunger in the housing for exteriorly mounting a saw blade;
   a driving gear connected to a driving mechanism;
   a first eccentric shaft and a second eccentric shaft disposed on the driving gear;
   a link member, having a rear end portion and a front end portion, the rear end portion connected to the first eccentric shaft and the front end portion pivotally connected to a rear end portion of the plunger;
   a pushing member having a rear end portion rotatably connected to the second eccentric shaft;
   a lifting member pivotally connected to the housing, characterized in that:
   the lifting member contacts a front end portion of the pushing member and a sleeve bearing disposed on a rear end portion of the plunger, wherein an angle formed between lines through a central axis of the first eccentric shaft, a central axis of the driving gear and a central axis of the second eccentric shaft is obtuse, wherein the lines lie in a plane which is perpendicular to the first eccentric shaft.

2. A reciprocating saw as claimed in claim 1, wherein a front end portion of the pushing member bears against a lower rear end portion of the lifting member and an upper front end portion of the lifting member bears against the sleeve bearing.

3. A reciprocating saw as claimed in claim 1 further comprising: a spring between the housing and the sleeve bearing for biasing the lifting member against the pushing member.

4. A reciprocating saw as claimed in claim 1, wherein the first eccentric shaft and the second eccentric shaft are respectively provided on the top surface and the bottom surface of the driving gear.

5. A reciprocating saw comprising:
   an elongate housing;
   a bearing having an exterior radial connecting pin;
   a linearly reciprocative plunger extending internally along the elongate housing, said linearly reciprocative plunger having a trailing end portion and a leading end portion, wherein said linearly reciprocative plunger at or near to the trailing end portion is journalled within the bearing;
   a saw blade exteriorly connected to the leading end portion of the linearly reciprocative plunger;
   a rotary driving gear upon which are eccentrically disposed a first elongate shaft and a second elongate shaft, wherein an angle formed between lines through a central axis of the first elongate shaft, a central axis of the rotary driving gear and a central axis of the second elongate shaft is obtuse, wherein the lines lie in a plane which is perpendicular to the first elongate shaft;
   a link member having a first end and a second end, the first end of the link member being mounted radially on the first elongate shaft and the second end being coupled radially to the trailing end portion of the linearly reciprocative plunger, wherein in use the link member is linearly reciprocative in response to the rotation of the rotary driving gear;
   a push rod having a first end portion and a second end portion, wherein the first end portion of the push rod is mounted radially on the second elongate shaft and the push rod is linearly reciprocative in response to the rotation of the rotary driving gear in an opposing direction to the link member;
   a rocker pivotally mounted transversally on the elongate housing adjacent to the trailing end portion of the linearly reciprocative plunger, said rocker having a first end portion and a second end portion, wherein the first end portion of the rocker is in contact with the second end portion of the push rod and the second end portion of the rocker is engaged with the exterior radial connecting pin such that linear reciprocation of the push rod causes the rocker to pivot reciprocatively on the housing thereby causing the second end portion of the rocker to reciprocatively displace the exterior radial connecting pin substantially transversally thereby reciprocatively displacing the trailing end portion of the linearly reciprocative plunger substantially transversally; and
   a pivot member mounted in the elongate housing at or near to the leading end portion of the linearly reciprocative plunger about which the substantially transversally displaced trailing end portion of the linearly reciprocative plunger pivots thereby substantially transversally displacing the saw blade in an opposing transverse direction.

6. A reciprocating saw as claimed in claim 5 further comprising: a biasing member between the elongate housing and the sleeve bearing for biasing the lifting member against the pushing member.

7. A reciprocating saw as claimed in claim 5, wherein the first elongate shaft and the second elongate shaft are respectively disposed on the upper surface and lower surface of the driving gear.

8. A reciprocating saw as claimed in claim 5 wherein the rocker adopts a cradle-like configuration with a pair of substantially L-shaped bodies connected in parallel spaced apart relationship by a connecting portion, wherein each L-shaped body comprises a leg, an arm and an aperture at the intersection of the arm and leg, wherein the legs together define the first end portion of the rocker, the arms together define the second end portion of the rocker, the apertures are collinear for receiving a connecting pin fixed transversally to opposing faces of the elongate housing for pivotally mounting the rocker on the elongate housing.

* * * * *